United States Patent
Gorbach et al.

(10) Patent No.: US 12,111,881 B2
(45) Date of Patent: Oct. 8, 2024

(54) ITEM RECOMMENDATION WITH APPLICATION TO AUTOMATED ARTIFICIAL INTELLIGENCE

(71) Applicant: International Business Machines Corporation, Armonk, NY (US)

(72) Inventors: Nico Stephan Gorbach, Kilchberg (CH); Adelmo Cristiano Innocenza Malossi, Schönenberg (CH); Andrea Bartezzaghi, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 981 days.

(21) Appl. No.: 17/108,107

(22) Filed: Dec. 1, 2020

(65) Prior Publication Data
US 2022/0171985 A1 Jun. 2, 2022

(51) Int. Cl.
*G06F 17/00* (2019.01)
*G06F 17/18* (2006.01)
(Continued)

(52) U.S. Cl.
CPC .......... *G06F 18/2113* (2023.01); *G06F 17/18* (2013.01); *G06F 18/22* (2023.01); *G06F 18/232* (2023.01); *G06N 20/00* (2019.01)

(58) Field of Classification Search
CPC ....... G06N 20/00; G06F 17/18; G06F 18/232; G06F 18/2113; G06F 18/22
(Continued)

(56) References Cited

U.S. PATENT DOCUMENTS

| 2016/0132787 A1* | 5/2016 | Drevo | G06N 20/10 706/12 |
| 2017/0083522 A1 | 3/2017 | Somekh et al. | |

(Continued)

FOREIGN PATENT DOCUMENTS

CN 106897912 A 6/2017

OTHER PUBLICATIONS

J. P. Ono, S. Castelo, R. Lopez, E. Bertini, J. Freire and C. Silva, "PipelineProfiler: A Visual Analytics Tool for the Exploration of AutoML Pipelines," in IEEE Transactions on Visualization and Computer Graphics, vol. 27, No. 2, pp. 390-400, Feb. 2021. (Year: 2021).*

(Continued)

*Primary Examiner* — Cesar B Paula
*Assistant Examiner* — James H. Blackwell
(74) *Attorney, Agent, or Firm* — Eric W. Chesley (57) ABSTRACT

A plurality of rating values corresponding to the performance of each of a plurality of pipelines for a dataset of a plurality datasets is stored. The distance between each pair of datasets within the plurality is determined in a latent space. The distance corresponds to an expected value of a regret incurred when a selected pipeline is rated for a performance of the pipeline for a first dataset. The regret is a monotonically decreasing function of the rating value, according to the pipeline's performance. The plurality of datasets is clustered in the latent space, and a representative dataset in each cluster is identified. In response to receiving a new dataset, a set of preferred pipelines is selected from the plurality, according to a set of rating values corresponding to each of the selected pipelines' performance on the representative dataset. The new dataset is processed in the set of preferred pipelines.

20 Claims, 6 Drawing Sheets

(51) Int. Cl.
G06F 18/2113 (2023.01)
G06F 18/22 (2023.01)
G06F 18/232 (2023.01)
G06N 20/00 (2019.01)

(58) Field of Classification Search
USPC .......................................................... 706/12
See application file for complete search history.

(56) References Cited

U.S. PATENT DOCUMENTS

| | | | | |
|---|---|---|---|---|
| 2018/0157971 | A1* | 6/2018 | Fusi | G06N 7/01 |
| 2020/0125961 | A1* | 4/2020 | Agrawal | G06N 20/00 |
| 2020/0226490 | A1* | 7/2020 | Abdulaal | G06N 20/00 |
| 2020/0272909 | A1* | 8/2020 | Parmentier | G06N 3/126 |
| 2021/0241182 | A1* | 8/2021 | Shrivastava | G06N 20/20 |

OTHER PUBLICATIONS

Karmaker ("Santu"), Md. Mahadi Hassan, Micah J. Smith, Lei Xu, Chengxiang Zhai, and Kalyan Veeramachaneni. 2021. AutoML to Date and Beyond: Challenges and Opportunities. ACM Comput. Surv. 54, 8, Article 175 (Nov. 2022), 36 pages. (Year: 2022).*
Drozdal, J. et al., 2020. Trust in AutoML: exploring information needs for establishing trust in automated machine learning systems. In Proceedings of the 25th International Conference on Intelligent User Interfaces (IUI '20). Association for Computing Machinery, New York, NY, USA, 297-307. (Year: 2020).*
Weidele, ., Justin D. Weisz, Eno Oduor, Michael J. Muller, Josh Andres, Alexander G. Gray and Dakuo Wang. "AutoAIViz: opening the blackbox of automated artificial intelligence with conditional parallel coordinates." Proceedings of the 25th International Conference on Intelligent User Interfaces (2019) (Year: 2019).*
Feurer, Matthias, Katharina Eggensperger, Stefan Falkner, Marius Thomas Lindauer and Frank Hutter. "Auto-Sklearn 2.0: Hands-free AutoML via Meta-Learning." J. Mach. Learn. Res. 23 (2020): 261:1-261:61. (Year: 2020).*
Yang, C., Jicong Fan, Ziyang Wu, and Madeleine Udell. 2020. AutoML Pipeline Selection: Efficiently Navigating the Combinatorial Space. In Proceedings of the 26th ACM SIGKDD International Conference on Knowledge Discovery Data Mining (KDD '20). Association for Computing Machinery, New York, NY (Year: 2020).*
Yang, Chengrun, Jicong Fan, Ziyang Wu and Madeleine Udell. "Efficient AutoML Pipeline Search with Matrix and Tensor Factorization." ArXiv abs/2006.04216 (2020): n. pag. (Year: 2020).*
Paolo Viappiani and Craig Boutilier. 2009. Regret-based optimal recommendation sets in conversational recommender systems. In Proceedings of the third ACM conference on Recommender systems (RecSys '09). Association for Computing Machinery, New York, NY, USA, 101-108. (Year: 2009).*
Philipsen, Mark & Moeslund, Thomas. (2020). Distance in Latent Space as Novelty Measure. (Year: 2020).*
A. Truong, et al., "Towards Automated Machine Learning: Evaluation and Comparison of AutoML Approaches and Tools," in 2019 IEEE 31st International Conference on Tools with Artificial Intelligence (ICTAI), Portland, OR, USA, 2019 pp. 1471-1479. (Year: 2019).*
Mustafa Misir, Michèle Sebag, Alors: An algorithm recommender system, Artificial Intelligence, vol. 244, 2017, pp. 291-314 (Year: 2017).*
Raschka, S.. "Model Evaluation, Model Selection, and Algorithm Selection in Machine Learning." ArXiv abs/1811.12808 (2018): n. pag. (Year: 2018).*
Randal S. Olson, Nathan Bartley, Ryan J. Urbanowicz, and Jason H. Moore. 2016. Evaluation of a Tree-based Pipeline Optimization Tool for Automating Data Science. In Proceedings of the Genetic and Evolutionary Computation Conference 2016 (GECCO '16). ACM, New York, NY, USA, 485-492. (Year: 2016).*
Lars Kotthoff and Chris Thornton and Holger H. Hoos and Frank Hutter and Kevin Leyton-Brown, Auto-WEKA 2.0: Automatic model selection and hyperparameter optimization in WEKA, Journal of Machine Learning Research, 2017, pp. 1-5. (Year: 2017).*
Paolo Viappiani and Craig Boutilier. 2009. Optimal set recommendations based on regret. In Proceedings of the 7th International Conference on Intelligent Techniques for Web Personalization & Recommender Systems—vol. 528 (ITWP'09). CEUR-WS.org, Aachen, DEU, 20-31. (Year: 2009).*
Ariu et al., "Supplimentary Material: Regret in Online Recommendation Systems," 2020, 62 pages. (Year: 2020).*
Christakopoulou, Konstantina. (2018). Towards Recommendation Systems with Real-World Constraints. Retrieved from the University Digital Conservancy, https://hdl.handle.net/11299/201062. (Year: 2018).*
Zhang et al., "Diversity Balancing for Two-Stage Collaborative Filtering in Recommender Systems", Applied Sciences, Article, MDPI, Published: Feb. 13, 2020, 16 pages.
Zhu et al., "Addressing the Item Cold-start Problem by Attribute-driven Active Learning", Journal of Latex Class Files, arXiv:1805.09023v1 [cs.IR] May 23, 2018, 14 pages.
Istrate et al., "Tapas: Train-less accuracy predictor for architecture search", Thirty-third AAAI conference on artificial intelligence (AAAI-19), 2019, 8 pages.
Fusi et al., "Probabilistic Matrix Factorization for Automated Machine Learning", In Advances in Neural Information Processing Systems, arXiv:1705.05355v2 [stat.ML] May 1, 2018, 14 pages.
Auer et al., "Finite-time Analysis of the Multiarmed Bandit Problem", Machine Learning, 47(2):235-256, 2002.
Liu et al., "Wisdom of the Better Few: Cold Start Recommendation via Representative based Rating Elicitation", RecSys'11, Oct. 23-27, 2011, 8 pages.

* cited by examiner

ITEM RECOMMENDATION WITH APPLICATION TO AUTOMATED ARTIFICIAL INTELLIGENCE

BACKGROUND

The present disclosure relates generally to item recommendation and has a particular application in the field of automated artificial intelligence (AutoAI). Computer-implemented methods are provided for selecting preferred machine learning pipelines for processing datasets, together with systems and computer program products implementing such methods. Corresponding methods are also applied in network-based item recommender systems.

Machine learning (ML) models are used extensively in science and technology, with applications in computer vision, speech recognition, image processing, medical diagnosis, genetic analysis, pharmaceutical design, network fault analysis and intruder detection, among a great many others. Machine learning techniques involve processing a dataset of training data from the real-world application in relation to basic model for the application in order to train, or optimize, the model for the application in question. The model can then be applied to perform inference tasks based on new (previously unseen) data generated in that application. Numerous machine learning models have been developed, including a variety of models based on artificial neural networks such as so-called "deep learning" networks, as well as support vector machines, Bayesian networks, decision tree models, and many more. Given the increasing demand for ML applications and the ever-growing number of ML models available, the process of selecting appropriate models for different applications is becoming increasingly important. AutoAI systems aim to assist with this task, applying intelligent automation to the process of selecting and tuning machine learning pipelines, from preparation of training datasets through selection, training and evaluation of models and tuning of model parameters.

SUMMARY

One aspect of the present disclosure provides a computer-implemented method for selecting preferred machine learning pipelines for processing new datasets. The method includes, for a plurality of machine learning pipelines and a plurality N of datasets previously-processed by the pipelines, storing rating values each rating performance of a pipeline for a dataset. For each pair $u_{i=1 \text{ to } N}$, $u_{j=1 \text{ to } N}$, $i \neq j$, of the previously-processed datasets, the method determines a distance dig from $u_i$ to $u_j$ in a latent space for datasets. The distance $d_{i,j}$ corresponds to an expected value of a regret incurred when a pipeline, selected in a predetermined manner based on the rating values for dataset $u_j$, is rated for dataset $u_i$. The regret for a pipeline here is a monotonically decreasing function of the rating value for performance of that pipeline for dataset $u_i$. The method then clusters the previously-processed datasets in the aforementioned latent space, and identifies a representative dataset in each cluster for which the distance to that dataset from other datasets in that cluster is minimized over the cluster. The method further comprises, in response to receipt of a new dataset, selecting a set of preferred pipelines for processing that dataset, each preferred pipeline being selected in dependence on the rating values for a representative dataset. The new dataset is then processed in this set of preferred pipelines.

Methods embodying this aspect of the disclosure exploit a latent space, in which datasets are embedded based on a notion of "pairwise expected regret", for selecting preferred pipelines for new datasets. This pairwise expected regret, which determines distance between each pair of datasets in the latent space, captures an expected drop in performance rating for a pipeline on a dataset when that pipeline is selected based on performance ratings for another dataset. These embodiments are further predicated on the idea that all datasets, including new ones, are drawn from a multi-modal probability distribution over the latent space. By clustering datasets in this space, the datasets can be grouped into "neighborhoods" for which a number of representative datasets, one from each neighborhood, can be identified. New datasets are likely to be close to these representative datasets in the latent space. By selecting preferred pipelines based on rating values of representative datasets, the selected pipelines are likely to be rated highly for new datasets. Pipelines can be selected to maximize this likelihood as explained in detail below. Methods embodying the disclosure thus offer an effective and elegant solution to the problem of selecting preferred ML pipelines for new datasets in AutoAI. This leads to more efficient training of ML models, better performing models, and improved operation of user applications for these models. Aside from dealing with the cold-start problem, embodiments of the disclosure also offer improved control of the exploitation-exploration trade-off. This and other advantages will be explained in more detail below.

Typically, the new dataset will be a sample dataset, supplied by a user, which is broadly representative of user data for which an ML model is to be trained for inference in the user application. Embodiments may be envisaged in which only one preferred pipeline is selected for a new dataset. The foregoing method then selects a pipeline in dependence on the ratings for a representative dataset, and this pipeline can be trained by processing the new dataset and subsequently applied for inference on new data for the user application. Usually, however, a user will have a budget allowing training of a plurality of pipelines before choosing one for the user application. Embodiments of the disclosure can then select a plurality of preferred pipelines in dependence on ratings for a plurality of representative datasets. This allows assessment of pipelines selected based on ratings for more than one of the representative datasets, one of which will be closest to the new dataset in the aforementioned latent space.

The regret for a pipeline $P_k$ rated for dataset $u_i$ can be conveniently determined as a function of the difference between the maximum rating value for performance of pipelines on dataset $u_i$ and the rating value for performance of pipeline $P_k$ on dataset $u_i$. Regret thus depends on the drop in rating for a pipeline k compared to the highest-rated pipeline for a given dataset.

The aforementioned predetermined manner for selecting pipelines (on which calculation of expected regret and hence pairwise distances is based) may vary in different embodiments. Some embodiments might select a predetermined pipeline, e.g., the highest-rated pipeline, in which case the expected value of the regret will be the regret incurred for that pipeline. However, preferred embodiments employ a stochastic process, whereby the predetermined manner for selecting a pipeline based on the rating values for a dataset comprises selecting the pipeline as a random variable from a probability distribution conditioned on the rating values for that dataset. The expected value of the regret then comprises a probability-weighted average of the regret incurred for pipelines which are selected based on the rating values for dataset $u_j$ and rated for dataset $u_i$. This provides the basis for controlled exploration of possible pipeline recommendations for a new dataset.

Particularly preferred methods allow approximation of the representative dataset which is closest to a new dataset in the latent dataset space. In particular, for a plurality of preferred pipelines which are selected in dependence on the rating values for corresponding representative datasets, these embodiments determine a rating value for performance of each preferred pipeline for the new dataset, and calculate the regret incurred for each preferred pipeline for the new dataset. At least one further preferred pipeline is then selected, in the aforementioned predetermined manner, based on the rating values for the representative dataset corresponding to the preferred pipeline with the lowest regret for the new dataset. The new dataset is then processed in each further preferred pipeline. Calculating the regret for preferred pipelines rated for the new dataset allows the representative dataset which is closest to the new dataset in the latent space to be determined with increasing accuracy as more pipelines are rated for the new dataset. Additional pipelines can then be selected stochastically by drawing from the probability distribution for this closest representative. This technique, explained further below, allows controlled exploration of pipeline recommendations (i.e. selected pipelines) while pipeline selection is still guided by ratings for a representative dataset which is close to the new dataset in the latent dataset space. Pipelines selected based on ratings of the closest representative are most likely to yield the lowest regret for the new dataset. Due to the monotonicity of the regret with respect to pipeline ratings, this yields the highest expected ratings for performance of selected pipelines on new datasets.

The probability of selecting a pipeline from the probability distribution for a dataset may vary directly with the rating value for performance of that pipeline on that dataset. Higher-rated pipelines are then more likely to be selected. In particularly preferred embodiments, the probability distribution for a dataset is dependent on a parameter β whose value determines the degree of dependence of the probability distribution on the rating values for the dataset. Preferred methods select a value of the parameter β to provide a desired degree of dependence of probability distributions on rating values. In these embodiments, the "greedy parameter" β provides efficient control of the exploitation-exploration trade-off while exploration can still be guided by ratings for representative datasets.

Another aspect of the disclosure provides a computing system for selecting preferred machine learning pipelines for processing new datasets. The system includes memory for storing the rating values described above, and embedding logic adapted to determine the pairwise distances in the latent space for datasets. The computing system also includes clustering logic for clustering datasets in the latent space and identifying representative datasets as described above. Pipeline selector logic of the system selects the set of preferred pipelines as described above, and supplies the new dataset to this set of pipelines for processing. The computing system may include a machine learning system which implements the plurality of machine learning pipelines.

A further aspect of the disclosure provides a computer program product comprising a computer readable storage medium embodying program instructions, executable by a computing system, to cause the computing system to perform a pipeline selection method described above.

While the disclosure finds particular application in the field of AutoAI, methods embodying the disclosure can also be applied to advantage in item recommender systems. A further aspect of the disclosure thus provides a computer-implemented method for selecting items for recommendation to new users in a recommender system implemented in a computer network. The method includes, for a plurality of items and a plurality N of previous users of the system, storing rating values each indicating a previous user's rating of an item. For each pair ($u_{i=1\ to\ N}$, $u_{j=1\ to\ N}$), i≠j, of the previous users, the method determines a distance $d_{i,j}$ from $u_i$ to $u_j$ in a latent space for users, where the distance $d_{i,j}$ corresponds to an expected value of a regret incurred when an item, selected in a predetermined manner based on the rating values of a user $u_j$, is rated by a user $u_i$. The regret for an item is a monotonically decreasing function of the rating value for that item as rated by user $u_i$. The method then clusters the previous users in the latent space and identifies a representative user in each cluster for which the distance to that user from other users in that cluster is minimized over the cluster. The method further comprises, in response to detection of a new user by the recommender system, selecting a set of preferred items for recommendation to that user, each preferred item being selected in dependence on the rating values for a representative user. A recommendation of the set of preferred items is provided for display to the new user via a user interface.

Preferred embodiments here may receive a rating value for each preferred item from the new user and calculate the regret incurred for each preferred item rated by the new user. At least one further preferred item for recommendation can then be selected stochastically (in like manner to the stochastic pipeline selection process described above) based on the rating values for the representative user corresponding to the preferred item with the lowest regret for the new user.

Embodiments of the disclosure will be described in more detail below, by way of illustrative and non-limiting example, with reference to the accompanying drawings.

DETAILED DESCRIPTION

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments to be described can be performed as computer-implemented methods for selecting preferred machine learning pipelines for processing new datasets, or for selecting items for recommendation to new users in a network-based recommender system. Such methods may be implemented by a computing system comprising one or more general- or special-purpose computers, each of which may comprise one or more (real or virtual) machines, providing functionality for implementing operations described herein. Steps of methods embodying the disclosure may be implemented by program instructions, e.g. program modules, implemented by a processing apparatus of the system. Generally, program modules may include routines, programs, objects, components, logic, data structures, and so on that perform particular tasks or implement particular abstract data types. The computing system may be implemented in a distributed computing environment, such as a cloud computing environment, where tasks are performed by remote processing devices that are linked through a communications network. In a distributed computing environment, program modules may be located in both local and remote computer system storage media including memory storage devices.

Embodiments of the present disclosure contemplate techniques for deciding which particular ML pipeline will perform best for a given application. This could be determined, in theory, by processing a training dataset in all available pipelines and then selecting the best-performing pipeline for the application. However, training ML models is a compute- and time-intensive task. Users typically provide a sample dataset, representative of their application data, for test purposes, and may have a budget for testing only a limited number of pipeline options. Performance of the final, trained models in user applications, and hence performance of the applications themselves, depends on the best ML pipelines being selected by AutoAI processes.

The problem of selecting pipelines for user datasets has some similarity to that of item recommendation in recommender systems. Recommender systems use various techniques for recommending items (such as products, movies, songs, etc.) to a user based on ratings given by other users to those items and/or ratings for other items by the user. These systems rely on the key premise that users who have rated items similarly in the past tend to rate items similarly in the future. Common approaches to recommender systems include collaborative filtering, content based recommendation and low rank matrix factorization. All these approaches, however, suffer from the so-called "cold-start" problem which arises when recommending items to new users for which there is no previously-observed rating information.

One way in which recommender systems handle the cold-start problem is to recommend the most popular items to new users. While such an approach maximally exploits the available ratings of users, it does not explore alternative, potentially more preferred items. The so-called "epsilon-greedy" approach (see "Finite-time Analysis of the Multi-armed Bandit Problem", Auer et al., Machine Learning 47(2): 235-256) addresses the problem by recommending the most popular item with a probability of (1−epsilon), and recommending a random item with a probability of epsilon. The epsilon-greedy approach explicitly controls the exploitation-exploration trade-off via the parameter epsilon, but the exploration of alternative items (alternative to the most popular item) is random and unguided. Matrix-based factorization techniques have also been proposed, whereby the ratings for a large number of items are reconstructed by a linear combination of only a few item ratings. New users then only need to rate a few items in order to infer ratings for the remaining items (see, for example, "Wisdom of the Better Few: Cold Start Recommendation via Representative based Rating Elicitation", Nathan Lui et al., RecSys'11, 2011). With matrix-based factorization, there is a risk of exposing the user to a number of poorly-rated items prior to making a recommendation. In addition, these techniques do not explicitly control the exploitation-exploration trade-off, and the factorization problem is difficult to solve due to the discontinuity of the objective.

A technique based on item recommendation has been applied to ML pipeline selection in "Probabilistic matrix factorization for automated machine learning", Fusi et al., Advances in Neural Information Processing Systems, 2018. This technique employs matrix-based factorization, as discussed above, and does not further address the cold-start problem. "Tapas: Train-less Accuracy Predictor for Architecture Search", Istrate et al., Proceedings of the AAAI Conference on Artificial Intelligence, 33:3927-3934, 2019 proposes a technique for predicting accuracy of deep learning networks for unseen datasets. This technique characterizes a new dataset based on various dataset features, and requires encoding of the internal structure of deep learning models. This encoding process is non-trivial, particularly for arbitrary ML pipelines.

Improved techniques for selecting ML pipelines for new user datasets, and for addressing the cold-start problem in general, would be highly desirable.

Figure 1:
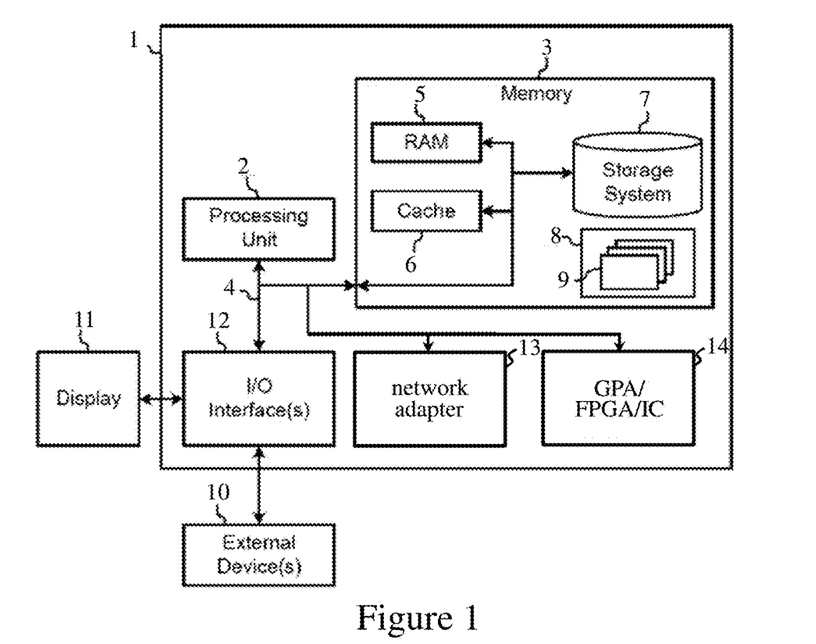
FIG. 1 is a schematic representation of a computing system for implementing methods embodying the disclosure.

FIG. 1 is a block diagram of exemplary computing apparatus for implementing methods embodying the disclosure. The computing apparatus is shown in the form of a general-purpose computer 1. The components of computer 1 may include processing apparatus such as one or more processors represented by processing unit 2, a system memory 3, and a bus 4 that couples various system components including system memory 3 to processing unit 2.

Bus 4 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 1 typically includes a variety of computer readable media. Such media may be any available media that is accessible by computer 1 including volatile and non-volatile media, and removable and non-removable media. For example, system memory 3 can include computer readable media in the form of volatile memory, such as random access memory (RAM) 5 and/or cache memory 6. Computer 1 may further include other removable/non-removable, volatile/non-volatile computer system storage media. By way of example only, storage system 7 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 4 by one or more data media interfaces.

Memory 3 may include at least one program product having one or more program modules that are configured to carry out functions of embodiments of the disclosure. By way of example, program/utility 8, having a set (at least one) of program modules 9, may be stored in memory 3, as well as an operating system, one or more application programs, other program modules, and program data. Each of the operating system, one or more application programs, other program modules, and program data, or some combination thereof, may include an implementation of a networking environment. Program modules 9 generally carry out the functions and/or methodologies of embodiments of the disclosure as described herein.

Computer 1 may also communicate with: one or more external devices 10 such as a keyboard, a pointing device, a display 11, etc.; one or more devices that enable a user to interact with computer 1; and/or any devices (e.g., network card, modem, etc.) that enable computer 1 to communicate with one or more other computing devices. Such communication can occur via Input/Output (I/O) interfaces 12. Also, computer 1 can communicate with one or more networks such as a local area network (LAN), a general wide area network (WAN), and/or a public network (e.g., the Internet) via network adapter 13. As depicted, network adapter 13 communicates with the other components of computer 1 via bus 4. Computer 1 may also communicate with additional processing apparatus 14, such as one or more GPUs (graphics processing units), FPGAs, or integrated circuits (ICs), for implementing embodiments of the disclosure. It should be understood that other hardware and/or software components may be used in conjunction with computer 1. Examples include, but are not limited to: microcode, device drivers, redundant processing units, external disk drive arrays, RAID systems, tape drives, and data archival storage systems, etc.

Figure 2:
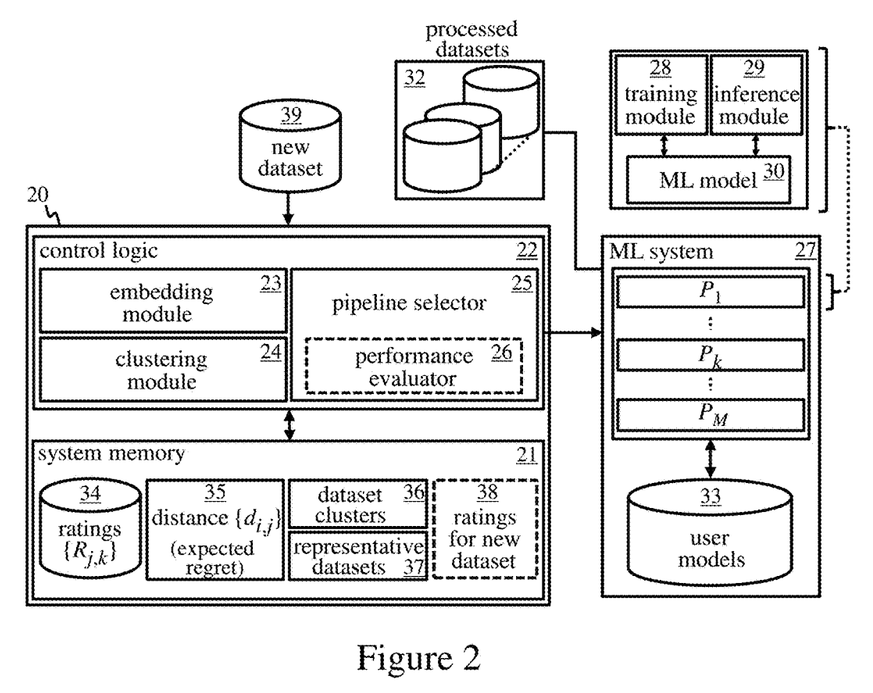
FIG. 2 illustrates component modules of a computing system for selecting preferred ML pipelines for new datasets.

The FIG. 2 schematic illustrates component modules of an exemplary computing system for selecting ML pipelines in an AutoAI system. The computing system 20 comprises memory 21 and control logic, indicated generally at 22, comprising functionality for selecting preferred ML pipelines for new user datasets. Control logic 22 comprises an embedding module 23, clustering module 24, and a pipeline selector 25. As indicated in dashed lines in the figure, in preferred embodiments the pipeline selector 25 includes a performance evaluator 26. Each of the logic modules 23 through 26 comprises functionality for implementing particular steps of a pipeline selection method detailed below. In particular, system 20 interfaces with an ML system 27 which implements a plurality M of machine learning pipelines, denoted by $P_k$, k=1 to M. Each pipeline $P_k$ includes functionality for training and evaluating an ML model for an input dataset. As illustrated schematically for pipeline Pi, each pipeline includes a training module 28 and an inference module 29 for training and evaluating performance, respectively, of an ML model 30. ML model 30 may be implemented in any desired manner, and may comprise one or more component models of one or more types. Each pipeline $P_k$ may include additional functionality (not shown) of generally known type, e.g. for preparing (cleaning or otherwise preprocessing) datasets, and for tuning of pipeline parameters. When a dataset 32 has been processed by ML system 27 and an ML pipeline has been trained for the user application, the parameters of the trained model are stored in model database 33 for subsequent use in the user application. In general, ML system 27 may be local or remote from computing system 20 and may be integrated with system 20 in some embodiments.

Modules 23 through 26 of control logic 22 interface with memory 21 which stores various data structures used in operation of system 20. These data structures include: a set 34 of rating values $\{R_{j,k}\}$, each rating performance of a pipeline $P_k$ for a previously-processed dataset 32; a set 35 of distances $\{d_{i,j}\}$ described further below; clustering data defining dataset clusters 36; and representative datasets 37 derived from dataset clusters 36. Preferred embodiments also store a set of performance ratings 38, determined for a new user dataset 39, as explained further below.

In general, functionality of logic 23 through 30 may be implemented by software (e.g., program modules) or hardware or a combination thereof. Functionality described may be allocated differently between system modules in other embodiments, and functionality of one or more modules may be combined. The component modules of computing system 20 may be provided in one or more computers of a computing system. For example, all modules may be provided in a computer 1, or modules may be provided in one or more computers/servers of an AutoAI system to which users can connect via a network for input of datasets to be processed. Such a network may in general comprise one or more component networks and/or internetworks, including the Internet. System memory 21 may be implemented by one or memory/storage components associated with one or more computers of system 20.

Figure 3:
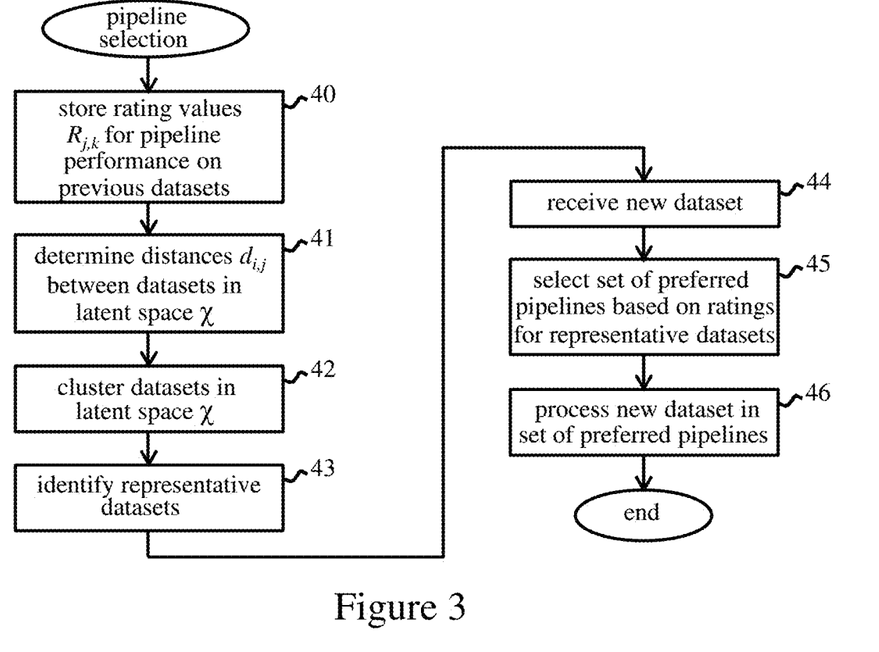
FIG. 3 indicates steps of a pipeline selection method performed by the FIG. 2 system.

In operation, system 20 selects a set of preferred ML pipelines for processing a new dataset 39 in ML system 27. Basic steps performed by system 20 are indicated in FIG. 3. Step 40 represents storage in system memory 21 of the ratings $\{R_{j,k}\}$. In particular, for the M pipelines $P_k$, k=1 to M, and a plurality N of previously-processed datasets 32 denoted by $u_j$, j=1 to N, each rating value $R_{j,k}$ in set 34 rates performance of the pipeline $P_k$ for the dataset $u_j$. As illustrated, an ML system 27 may offer a great many (e.g. hundreds or even thousands) of pipeline implementations. These may be trained over time on similar numbers of datasets, both test datasets and user datasets, with training typically being a continued process as new training data becomes available. Pipeline performance can be rated here in any convenient manner Rating values may, for instance, indicate overall accuracy of inference results produced by an ML model, or may be based on precision and/or recall, or some combination of these and/or other performance metrics.

In step 41, the embedding module 23 determines a set of pairwise distances between the previously-processed datasets in a notional latent space, denoted by x, for datasets. Specifically, for each pair $u_{i=1 \ to \ N}$, $u_{j=1 \ to \ N}$, i≠j, of the previously-processed datasets, embedding module 23 determines a distance d from $u_i$ to $u_j$ in the latent space χ. This distance $d_{i,j}$ corresponds to an expected value of a regret incurred when a pipeline, which is selected in a predetermined manner based on the rating values for dataset $u_j$, is rated for dataset $u_i$. The regret for a pipeline here is a monotonically decreasing function of the rating value for performance of that pipeline for dataset $u_i$. The resulting pairwise distances are asymmetric, i.e. $d_{i,j}$ and $d_{j,i}$ may be different. The predetermined manner in which pipelines may be selected based on rating values for a dataset, and the calculation of regret values here, will be explained further below. The resulting distances $\{d_{i,j}\}$ are stored at 35 in system memory 21.

In step 42, the clustering module 24 clusters the previously-processed datasets 32 in the latent space χ. Clustering is a well-known process for assigning items (here datasets) to groups (clusters) such that distance (measured in some defined space) between items within each cluster is minimized Here, therefore, clustering module 24 clusters datasets in latent space $\chi$ such that the pairwise distances between datasets (and hence pairwise expected regret) within each cluster is minimized Data defining the resulting dataset clusters is stored at 36 in system memory 21. In step 43, the clustering module uses distance set 35 to identify a representative dataset in each cluster. The representative dataset is identified in each cluster as the dataset for which the distance $d_{i,j}$ to that dataset from other datasets in that cluster is minimized over the cluster. Representative datasets are thus located near the modes of the dataset distribution in latent space $\chi$. The representative datasets identified by this process are stored at 37 in system memory 21.

Receipt by system 20 of a new dataset 39 for processing in ML system 27 is represented by step 44 in FIG. 3. In step 45, the pipeline selector 25 selects a set of preferred ML pipelines for processing the new dataset. Each preferred pipeline is selected here in dependence on rating values for a representative dataset. This selection process is described in more detail below. In step 46, the new dataset 39 is supplied to ML system 27 and processed in each preferred pipeline selected by pipeline selector 25.

The above process embeds processed datasets in the latent space $\chi$ based on the notion of a pairwise expected regret which reflects drop in performance rating for a pipeline on a dataset when that pipeline is selected based on ratings for another dataset. The datasets are clustered into groups, or "neighborhoods", from which representative datasets, close to modes of the dataset distribution, are identified. A new dataset 39 is likely to lie close to one of the modes, and hence close to a representative dataset. By selecting preferred pipelines based on ratings for representative datasets, the selected pipelines are likely to be rated highly, and thus perform well, for new datasets.

Scenarios may be envisaged where only one pipeline can be trained for a new dataset, in which case pipeline selector 25 selects a preferred pipeline in step 45 in dependence on ratings for one of the representative datasets, e.g., as the highest-rated pipeline for that dataset. Generally, however, a plurality of preferred pipelines will be selected in step 45 in dependence on ratings for a plurality of representative datasets. Since one of the representative datasets will be closest to the new dataset in latent space $\chi$, and hence incur the least expected regret, this increases the likelihood of selecting a high-performance pipeline for the new dataset. Pipeline processing typically involves not only training but also testing performance of the trained model, for example on a holdout set, i.e. a subset of the original dataset reserved for testing inference performance Based on results of these performance tests, pipeline selector 25 can identify the best-performing pipeline for the user application.

Where a user's budget allows testing of multiple pipelines, preferred embodiments employ particularly advantageous techniques for pipeline selection. These techniques allow approximation of the representative dataset which is closest to a new dataset in the latent space $\chi$, as well as controlled exploration of pipeline recommendations. An exemplary embodiment employing these techniques is described in detail in the following.

Figure 4:
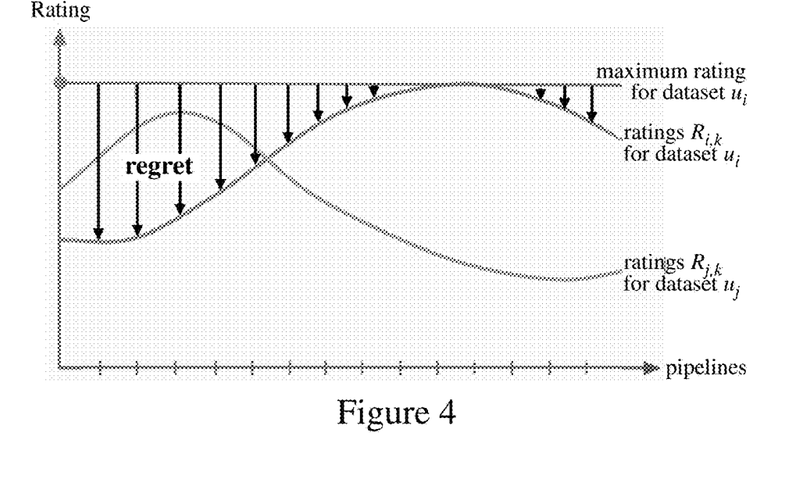
FIG. 4 is a schematic illustration of a regret calculated in pipeline selection methods embodying the disclosure.

This preferred embodiment exploits a stochastic pipeline selection process. In particular, the aforementioned predetermined manner for selecting pipelines (on which calculation of expected regret and pairwise distances is based in step 41 of FIG. 3) is a stochastic process. Specifically, a pipeline is selected as a random variable from a probability distribution conditioned on the rating values for that dataset. The expected value of the regret then comprises a probability-weighted average of the regret incurred for pipelines which are selected based on the rating values for dataset $u_j$ and rated for dataset $u_i$. In this embodiment, the regret for a pipeline $P_k$, selected based on ratings for a dataset $u_j$ and rated for dataset $u_i$, is a function of the difference between the maximum rating value for performance of pipelines on dataset $u_i$ and the rating value for performance of pipeline $P_k$ on dataset $u_i$. In particular, the regret $G(k; u_i)$ for a pipeline $P_k$ rated for a dataset $u_i$ is given by:

$$G(k; u_i) = \max_{s \in \{1 \, to \, M\}} (R_{i,s}) - (R_{i,k})$$

where $R_{i,k}$ is the rating for performance of pipeline $P_k$ on dataset $u_i$. This is illustrated schematically in FIG. 4 which shows that the regret G, indicated by bold arrows, is a monotonically decreasing function of $(R_{i,k})$, corresponding to the drop in rating of a pipeline $P_k$ for dataset $u_i$ compared to the highest-rated pipeline for a dataset $u_i$.

To ensure that higher-rated pipelines are more likely to be selected here, the probability of selecting a pipeline from the probability distribution for a dataset varies directly with the rating value for performance of that pipeline on that dataset. In this example, the probability $P(k|u_j)$ of selecting a pipeline $P_k$ from the probability distribution conditioned on the rating values for a dataset $u_j$ satisfies:

$$P(k|u_j) \propto \exp(-\beta(M_j - R_{j,k})),$$

where $M_j$ is the maximum rating for performance of pipelines on dataset $u_j$, and $R_{j,k}$ is the rating for performance of pipeline $P_k$ on dataset $u_j$.

Figure 5:
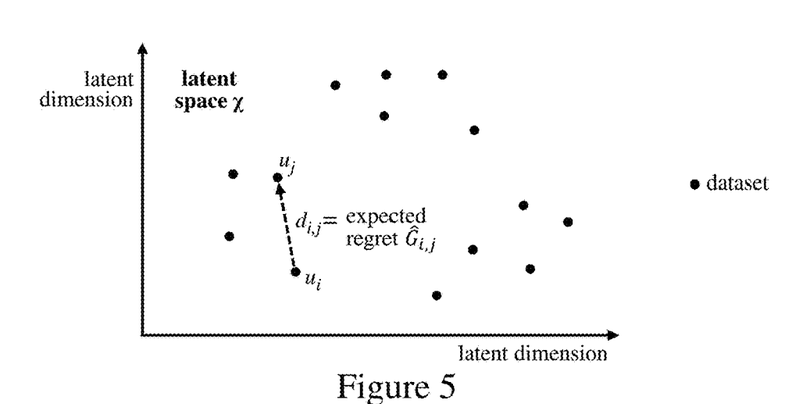
FIG. 5 is a schematic illustration of a distribution of datasets in a latent space employed in methods embodying the disclosure.

FIG. 5 is a simplified schematic illustrating embedding of datasets in the latent space $\chi$. Datasets are embedded in this space such that the distance $d_{i,j}$ from a dataset $u_i$ to a dataset $u_j$ corresponds to an expected value $\hat{G}_{i,j}$ of the regret incurred when a pipeline, selected as a random variable from the probability distribution $P(k|u_j)$ conditioned on the rating values for dataset $u_p$, is rated for dataset $u_i$. The expected regret $\hat{G}_{i,j}$ comprises a probability-weighted average of the regret incurred for pipelines which are selected based on the rating values for dataset $u_j$ and rated for dataset $u_i$. The distance $d_{i,j}$ from $u_i$ to $u_j$ in FIG. 5 is thus calculated, in embedding module 23, as:

$$d_{i,j} = \hat{G}_{i,j} = \Sigma_{k=1 \, to \, M}(P(k|u_j)G(k;u_i))$$

(where, if not all pipelines have been rated for previously processed datasets 32, then this value can be normalized over the number of pipelines rated for both $u_i$ and $u_j$).

For ease of illustration in FIG. 5, distances between datasets are visualized as symmetric ($d_{i,j} = d_{j,i}$), whereas these pairwise distances are in fact asymmetric. Since rating $R_{i,k}$ is a monotonically decreasing function of regret $G(k; u_i)$, the monotonicity also holds true for the expectations. That is, smaller expected regret values $\hat{G}_{i,j}$, and hence smaller distances $d_{i,j}$, correspond to higher expected values for the ratings $R_{i,k}$.

Figure 6:
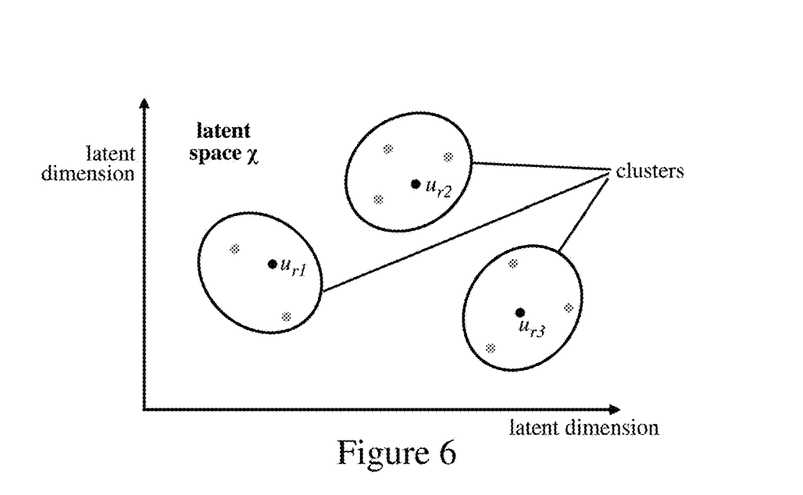
FIG. 6 illustrates clustering of datasets in the latent space of FIG. 5.

FIG. 6 is a simple illustration of the clustering process in this embodiment. Datasets are assumed to be drawn from a multimodal probability distribution in latent space $\chi$ and are clustered as illustrated so as to minimize the distance, and hence expected regret, between datasets in each cluster. Within each cluster, the representative dataset (here $u_{r1}$, $u_{r2}$, and $u_{r3}$ shown in bold in the figure) is the dataset for which the distance to that dataset from other datasets in that cluster is minimized over the cluster. The representative datasets are located closest to the modes of the multimodal probability distribution and thus locally minimize the pairwise expected regrets within the clusters. In this embodiment, affinity propagation is used for clustering, and identification of representative datasets, while respecting the asymmetry of the pairwise distances. However, any clustering method which respects asymmetric pairwise distances may be used in other embodiments.

Figure 7:
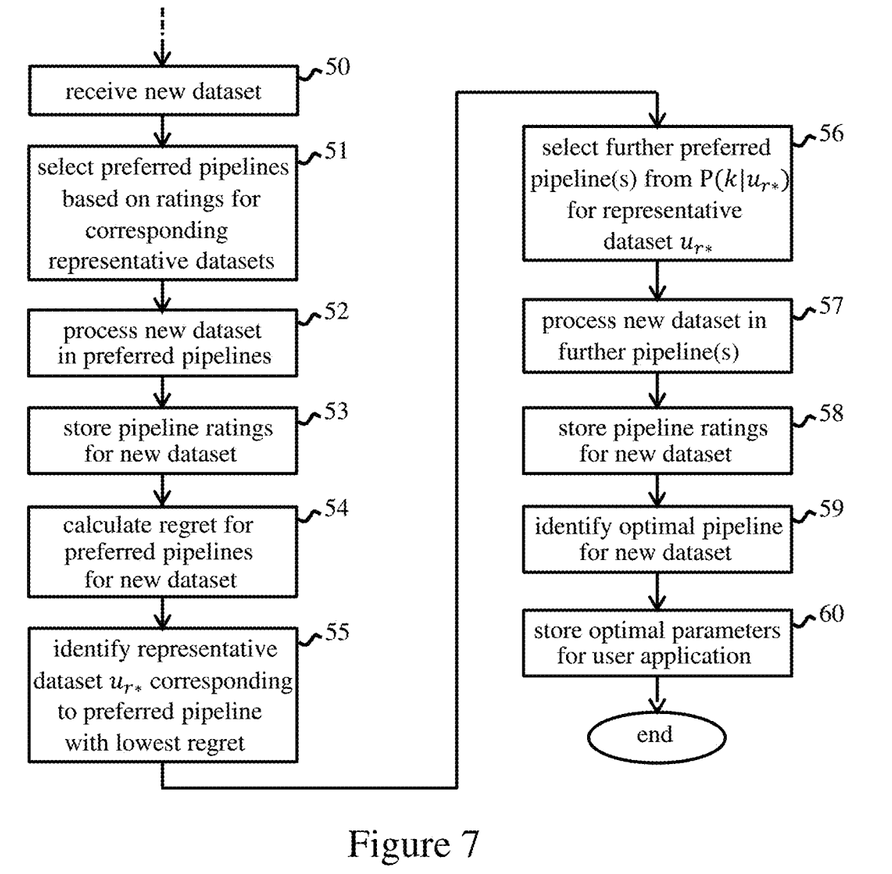
FIG. 7 indicates steps of a preferred pipeline selection method in an embodiment of the FIG. 2 system.

FIG. 7 indicates steps of the pipeline selection process in this embodiment. Step 50 represents arrival of a new dataset 39 for which a budget for testing multiple pipelines has been allocated. Previous operations correspond to steps 40 to 43 of FIG. 3 as described above. In step 51, the pipeline selector 25 selects a plurality of preferred pipelines. Each of these preferred pipelines is selected in dependence on the rating values for a corresponding representative dataset. In this example, the preferred pipelines are the highest-rated pipelines for the corresponding representative datasets. The number of pipelines selected here depends on the allocated budget as explained below. In step 52, the new dataset is processed in each of the preferred pipelines to determine a rating value for performance of each preferred pipeline for the new dataset. The resulting performance ratings 38 are stored in memory 21 as indicated at step 53. In step 54, pipeline selector 25 calculates the regret $G(k; u_{new})$ incurred for each preferred pipeline for the new dataset $u_{new}$. In step 55, the pipeline selector identifies the representative dataset $u_{r*}$ corresponding to the preferred pipeline with the lowest regret $G(k; u_{new})$ for the new dataset. In step 56, pipeline selector 25 selects at least one further preferred pipeline based on the rating values for this representative dataset $u_{r*}$. Each further preferred pipeline is selected as a random variable from the probability distribution P ($k|u_{r*}$) conditioned on the rating values for representative dataset In step 57, the new dataset is supplied to ML system 27 and processed in each further pipeline, whereby ratings 38 for performance of each further pipeline for $u_{new}$ are determined and stored at step 58. In step 59, the pipeline selector identifies an optimal pipeline for the new dataset as the pipeline with the highest rating value among the ratings for the new dataset 38 (e.g., performance ratings). In step 60, the optimal pipeline parameters can then be stored in database 33 for the user application.

Given that datasets are sampled from a multimodal distribution, new datasets will likely lie close to the modes of the distribution and therefore close to the representative datasets. The above process allows pipelines to be recommended for a new dataset $u_{new}$ by selection from the probability distribution $P(k|u_{r*})$ conditioned on the ratings of a particular representative dataset $u_{r*}$ which is likely to be close to $u_{new}$ in latent space $\chi$. Ideally, $u_{r*}$ is in closest proximity to $u_{new}$ in latent space $\chi$, i.e.:

$$u_{r*} = \underset{u_r \in U}{\operatorname{argmin}}(d_{new,r}) = \underset{u_r \in U}{\operatorname{argmin}}(\hat{G}_{new,r}),$$

whereby:

$$u_{r*} = \underset{u_r \in U}{\operatorname{argmin}}\left(\sum_{k=1\,to\,M}(P(k|u_r)G(k; u_{new}))\right).$$

where U defines the set of representative datasets (U={$u_{r1}$, $u_{r2}$, $u_{r3}$} in FIG. 6).

Since determining $u_{r*}$ exactly requires all pipelines to be rated for the new dataset, the above process approximates $u_{r*}$ by considering only the modes of the representative distributions:

$$u_{r*} \approx \underset{u_r \in U}{\operatorname{argmin}}(G(\hat{k}; u_{new})), \hat{k} = \underset{k=1\,to\,M}{\max}P(k|u_r).$$

The pipelines k here are the highest-rated pipelines for representative datasets as selected in step 51. If the user budget allows selection of highest-rated pipelines for all representative datasets in step 51, then $u_{r*}$ will be the closest representative to $u_{new}$ in latent space $\chi$. A further pipeline recommendation drawn from the probability distribution of this representative dataset is most likely to yield the lowest regret for the new dataset. Due to the monotonicity of the regret with respect to pipeline ratings, this yields the highest expected rating for performance of the selected pipeline on the new dataset. As pipelines corresponding to more representative datasets are selected and evaluated in steps 51 to 53, the approximation of $u_{r*}$ becomes increasingly accurate. Pipelines corresponding to each representative dataset can be selected one-by-one and rated for the new dataset. If the user budget is insufficient, then the budget may be used entirely to select preferred pipelines in step 51. Alternatively, part of the budget may be used to select pipelines in step 51, allowing an approximation of $u_{r*}$ (in step 55) based on these pipeline ratings, with additional pipelines then being drawn stochastically from the distribution $P(k|u_{r*})$ with $u_{r*}$ as approximated thus far. However, once pipelines corresponding to all representative datasets have been rated, the best approximation for $u_{r*}$ is obtained in step 55. All further pipeline recommendations can then be drawn from $P(k|u_r)$ in step 56 of FIG. 7. An optimal pipeline with the best performance can then be identified for the user application.

Figure 8A:
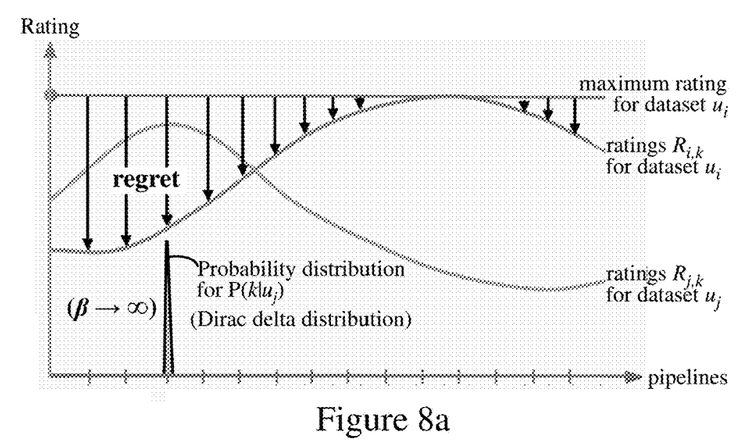
FIGS. 8a and 8b illustrate effect of a parameter β on pipeline selection probabilities in a preferred embodiment.
Figure 8B:
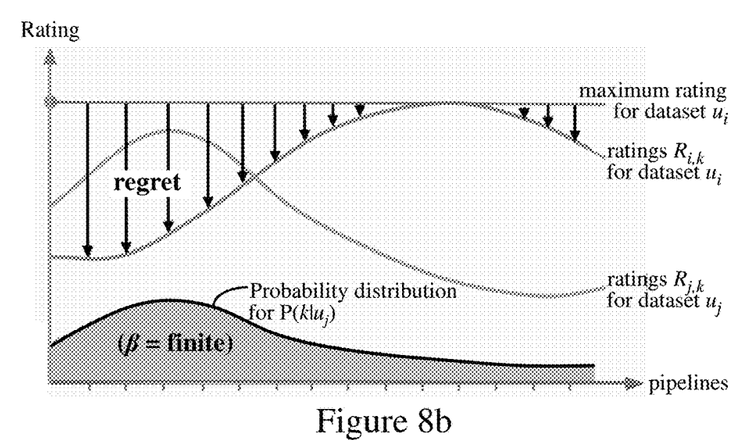

The above process provides an ingenious technique for ensuring that pipelines most likely to incur low regret values, and hence high ratings, are selected for a new dataset. Moreover, the parameter β in the probability distribution P ($k|u_j$) above allows control of the exploitation-exploration trade-off. This "greedy parameter" β determines the degree to which the probability distribution P ($k|u_j$) depends on the rating values for dataset $u_j$. FIGS. 8a and 8b illustrate how tuning the parameter β affects the probability distribution. FIG. 8a shows the distribution $P(k|u_j)$ in relation to ratings $R_{j,k}$ for dataset $u_j$ as β tends to infinity. At this extreme, only the highest-rated pipeline has a non-zero selection probability, leading to maximum exploitation (greedy). FIG. 8b shows the distribution P ($k|u_j$) with a finite value of β (β>0). Here, all pipelines have a non-zero selection probability, with probability increasing with rating $R_{j,k}$ (exploitation and exploration). Reducing the value of β further flattens the distribution, until at β=0 all pipelines will be selected with equal probability. At this extreme, pipeline selection probability is independent of the ratings $R_{j,k}$ (maximum exploration). The greedy parameter β thus allows explicit control of the exploitation-exploration trade-off. The value of β can be conveniently selected to provide a desired degree of dependence of P ($k|u_j$) on $R_{j,k}$, allowing controlled exploration of potential pipelines while still being guided by ratings of representative users via the selection process for preferred pipelines.

Embodiments might be envisaged in which the value of β can be set based on requirements for a new dataset, e.g. budget. For example, greater exploration may be feasible where many pipelines can be tested, whereas exploration may be limited for smaller budgets. The embedding and clustering processes are fast computations, and may be recomputed for this purpose in some embodiments. In preferred embodiments, however, an optimal value of β can be determined, based on previously-processed datasets 32, as the value which gives best results for pipeline selection. In these embodiments, the performance evaluator 26 can select an optimal value of the parameter β by cross-validation using the previously-processed datasets. Cross-validation is a well-known technique. Essentially here, performance evaluator 26 selects test subsets of the previously-processed datasets which are then treated as "new" datasets for testing performance of the predictive process. By iteratively testing performance over multiple test datasets and multiple values of β, the optimal value can be readily determined. The performance evaluator may recalculate this value periodically as more datasets are assimilated.

Figure 9:
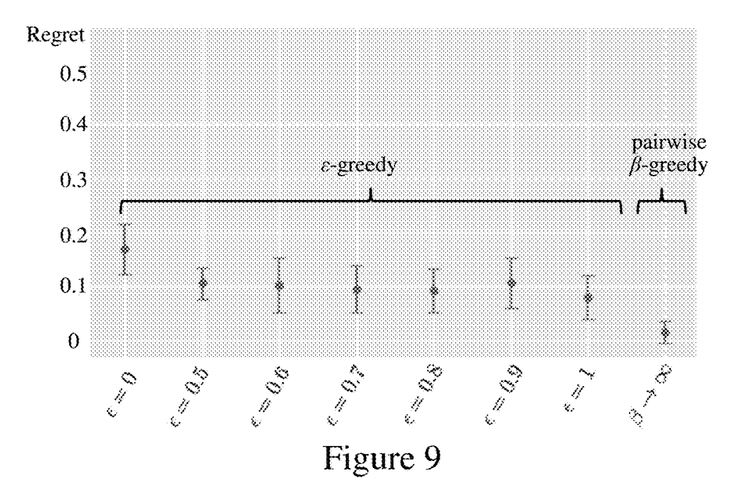
FIG. 9 compares performance of a pipeline selection method embodying the disclosure with a method based on item recommendation.

It will be seen that the above embodiment provides a highly effective solution to the cold-start problem and auto-selection of optimal ML pipelines for new datasets. The pairwise β-greedy cold-start approach described can provide exceptionally high-performance ML models and enhanced inference results for user applications. This approach has been demonstrated to outperform an epsilon-greedy approach with various parameter settings. As illustration, pairwise β-greedy and ε-greedy methods were trained on performances of about 5000 pipelines evaluated on about 500 datasets with a budget of 5 pipelines. FIG. 9 plots results for the regret calculated for holdout sets for various values of the parameter ε. Regret for the ε-greedy method was highest with ε=0 (maximum exploitation: most popular item (here highest-rated pipeline) always being selected), with regret generally decreasing with increasing exploration (higher ε). Even with maximum exploitation (β→∞), the pairwise β-greedy method incurred significantly lower regret than that obtained with all values of ε.

Various alternatives and modifications can of course be made to the embodiments described. By way of example, various probability distributions may be envisaged for rating-based pipeline selection in embodiments where this process is stochastic.

Figure 10:
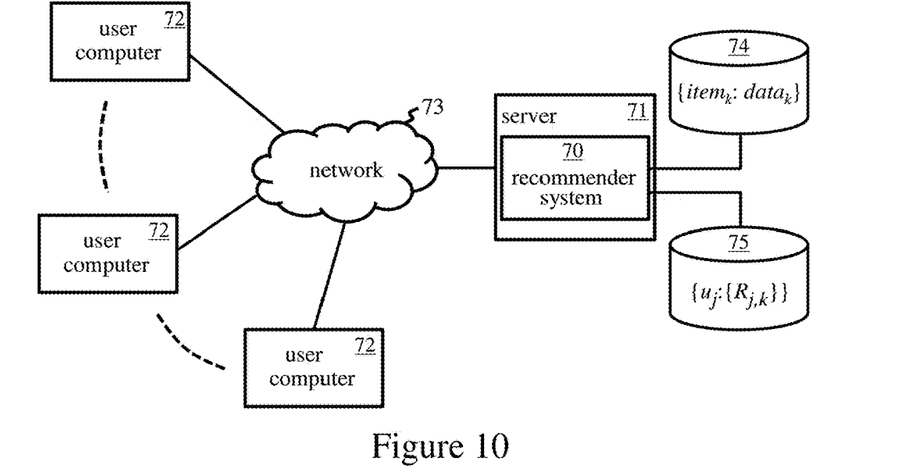
FIG. 10 is a schematic illustration of a network-based recommender system.

While the above techniques are particularly advantageous in the AutoAI application described, embodiments of the disclosure can also be applied to the cold-start problem in item recommender systems. FIG. 10 is a schematic illustration of such a recommender system implemented in a computer network. The recommender system 70 is implemented here in a server 71 to which user computers 72 can connect via a network, indicated schematically at 73. Network 73 may comprise one or more component networks and/or internetworks, including the Internet. User computers 72 may comprise various types of user device such as desktop, laptop or tablet computers, mobile phones, PDAs (personal digital assistants), televisions, game consoles, and so on, via which users can connect to remote server 71. In a typical scenario, recommender system 70 may be implemented in a server 71 (or set of servers) serving a web-based application such as a search engine, an on-line shopping site, a product comparison site, a movie/music/game download site, or any other service which can be accessed by users via a network.

In operation of such a service, recommender system 70 may recommend various items (products, songs, games, movies, software applications, etc.) to users based on user ratings for those items. These items have an item identifier, denoted here by $item_k$, (k=1, 2, 3, ... ), and associated item information, denoted by $data_k$, which can be presented to a user for recommending the item. Recommender system 70 can access a database 74 storing the set $\{item_k; data_k\}$ of information for these items. When a user, identified by a user identifier denoted here by $u_j$ (j=1, 2, 3, ... ), rates an item with identifier $item_k$, recommender system logs this rating, denoted by $R_{j,k}$, in a rating database 75. This database thus stores the item ratings $\{R_{j,k}\}$ for all users $u_j$ who have previously rated items in the system.

When new users, with previously unseen user identifiers, are detected by recommender system 70, the system can use the cold-start technique described earlier to recommend items to these users. This process is analogous to the pipeline selection process. That is, items can be selected for recommendation to new users in the same way that preferred pipelines are selected for processing new datasets. Items $item_k$ correspond to pipelines $P_k$, and users $u_j$ correspond to datasets $u_j$. Recommender system 70 can thus be implemented in like manner to system 20 of FIG. 2, with an embedding module 23, clustering module 24 and pipeline selector 25. Similarly, memory 21 of recommender system 20 stores the ratings database ((75 in FIG. 10), a set of distances $d_{i,j}$, user cluster data 36, a set of representative datasets 37, and may also store ratings 38 for a new user.

Figure 11:
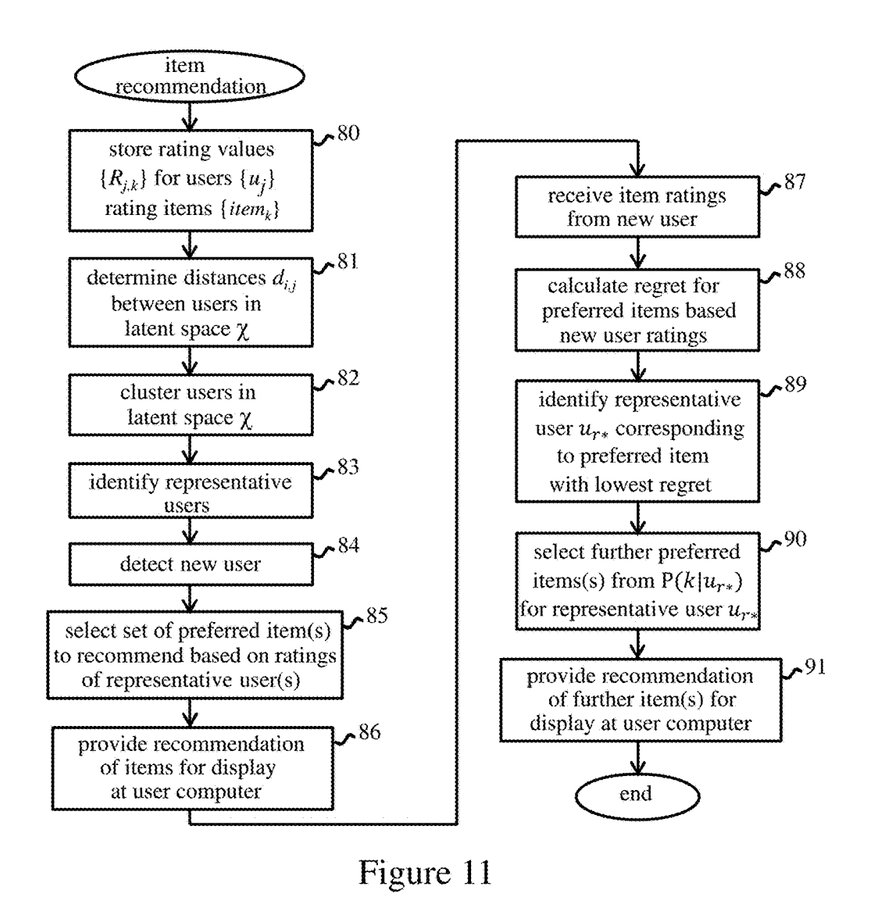
FIG. 11 indicates steps of a method embodying the disclosure for recommending items in the FIG. 10 system.

Operation of the recommender system 70 is illustrated in FIG. 11. Step 80 represents storage in database 74 of the rating values $\{R_{j,k}\}$ for previous users $\{u_j\}$ rating items $\{item_k\}$. In step 81, the embedding module 23 determines a set of pairwise distances between the previous users in a latent space χ for users. Specifically, for each pair $u_{i=1\ to\ N}$, $u_{j=1\ to\ N}$, i≠j, of the N previous users, embedding module 23 determines a distance $d_{i,j}$ from $u_i$ to $u_j$ in the latent space χ. This distance $d_{i,j}$ corresponds to an expected value of a regret incurred when an item, which is selected in a predetermined manner based on the rating values for users $u_j$, is rated for user $u_i$. The regret for an item here is a monotonically decreasing function of the rating value for that item as rated by user $u_i$. The resulting distances $\{d_{i,j}\}$ are stored at 35 in system memory 21.

In step 82, the clustering module 24 clusters the previous users in the latent space χ. As before, clusters are defined in the usual way such that the pairwise distances between users (and hence pairwise expected regret here) is minimized within each cluster. The resulting user clusters are stored at 36 in system memory 21. In step 83, the clustering module uses distance set 35 to identify a representative user in each cluster. The representative user is identified in each cluster as the user for which the distance $d_{i,j}$ to that user from other users in that cluster is minimized over the cluster. Representative users are thus located near the modes of the user distribution in latent space χ. The representative users are stored at 37 in system memory 21.

Detection of a new user by recommender system 70 is represented by step 84 in FIG. 11. In step 85, the item selector 25 selects a set of preferred items to recommend to the new user. Each preferred item is selected in dependence on the rating values for a representative user, e.g., as the highest-rated item for that user. In step 86, recommender system 70 provides a recommendation of the set of preferred items for display to the new user via a user interface at a user computer 72. Here, system 70 retrieves the item information $data_k$ for a preferred item from database 74, and sends this information to the user computer for display. The item information may be integrated by system 70 with other information, e.g., in a web page, which is displayed to the user by server 71. The item information (e.g. a picture and/or text with a link for further information/item rating) is thus displayed to the new user via a user computer 72.

In preferred embodiments here, the process can be extended with steps 87 to 91 in FIG. 11. Step 87 here represents receipt by recommender system 70 of a rating for each preferred item from the new user. In steps 88 to 90, the recommender system then selects at least one further preferred item in the same way that further pipelines are selected in steps 54 to 56 of FIG. 7. Hence, in step 88, the recommender system calculates the regret for each recommended item based on the received user ratings. The representative user $u_{r*}$ corresponding to the item with the lowest regret is identified in step 89. In step 90, further preferred item(s) can then be selected based on the rating values for the representative user $u_{r*}$. Each further preferred item can be selected here as a random variable drawn from a probability distribution $P(k|u_{r*})$ conditioned on the ratings of representative user $u_{r*}$, in direct analogy to the preferred pipeline selection process above. In step 91, the recommender system then provides a recommendation of each further preferred item for display to the new user via a user interface of user computer 72.

In general, implementation details for the pipeline selection embodiments above can be applied analogously for item recommendation in system 70. The β-greedy cold start approach can thus be applied in like manner to item recommendation. System 70 can therefore recommend items to new users which are popular within neighborhoods (clusters) of previous users, with guided exploration of possible item recommendations via the ratings of representative users and the greedy parameter β. This offers a recommender system in which items recommended to new users have high expected ratings for those users.

In general, where features are described herein with reference to a pipeline selection method embodying the disclosure, corresponding features may be provided in an item recommendation method embodying the disclosure. In addition, where features are described herein with reference to any method embodying the disclosure, corresponding features may be provided in a system/computer program product embodying the disclosure, and vice versa.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for selecting preferred machine learning pipelines for processing new datasets, the method comprising:
   for a plurality of machine learning pipelines and a plurality N of datasets previously-processed by the pipelines, storing a plurality of rating values, each rating value corresponding to a performance of a pipeline of the plurality of machine learning pipelines and for a dataset of the plurality N of datasets;
   for each pair $u_{i=1\ to\ N}$, $u_{j=1\ to\ N}$, $i \pm j$ of the plurality N of previously-processed datasets, determining a distance $d_{i,j}$ from $u_i$ to $u_j$ in a latent space, wherein the distance $d_{i,j}$ corresponds to an expected value of a regret incurred when the pipeline, selected in a predetermined manner based on a set of rating values for a dataset $u_j$, is rated for a performance of the selected pipeline for a dataset $u_i$, and wherein the regret for the selected pipeline includes a monotonically decreasing function of the rating value for the performance of the pipeline for the dataset $u_j$,
   clustering the plurality N of previously-processed datasets in the latent space and identifying a representative dataset in each cluster for which each distance to the dataset from other datasets in the cluster is minimized over the cluster;
   in response to receiving a new dataset, selecting a set of preferred pipelines from the plurality of machine learning pipelines for processing the new dataset, each preferred pipeline being selected according to a set of rating values for the representative dataset; and
   processing the new dataset in the set of preferred pipelines.

2. The method as claimed in claim 1, wherein the predetermined manner for selecting the pipeline based on the rating values for the dataset $u_j$ comprises:
   selecting the pipeline as a random variable from a probability distribution conditioned on the rating values for the dataset $u_j$; and
   wherein the expected value of the regret comprises a probability-weighted average of a set of regrets incurred for a respective set of preferred pipelines.

3. The method as claimed in claim 2, further comprising:
   determining a rating value for a performance of each pipeline of the set of preferred pipelines for the new dataset;
   calculating a regret incurred for each pipeline of the set of preferred pipelines for the new dataset;
   selecting at least one further preferred pipeline in the predetermined manner, based on the rating values for the performance and the representative dataset corresponding to the at least one further preferred pipeline with a lowest regret for the new dataset; and
   processing the new dataset in each of the at least one further preferred pipeline.

4. The method as claimed in claim 3, further comprising:
   determining a rating value for the performance of each of the at least one further preferred pipeline for the new dataset; and
   identifying, in response to the determination of the rating value for the performance of each of the at least one further preferred pipeline for the new dataset, a pipeline among the at least one further pipeline with a highest rating value for the new dataset.

5. The method as claimed in claim 4, wherein the set of preferred pipelines comprises a set of highest-rated pipelines for the corresponding representative datasets.

6. The method as claimed in claim 2, wherein a probability of selecting the pipeline from said probability distribution for the dataset uj varies directly with the rating value for performance of the selected pipeline on the dataset uj.

7. The method as claimed in claim 2, wherein:
   the probability distribution for the dataset uj is dependent on a parameter β, whose value determines a degree of the dependence of the probability distribution on the rating values for the dataset; and
   the method further comprises selecting a value of the parameter ß to provide a desired degree of dependence of the probability distribution on the set of rating values of the representative dataset.

8. The method as claimed in claim 7, further comprising selecting an optimal value of the parameter β, by cross-validation using the plurality N datasets.

9. The method as claimed in claim 7, wherein the probability $P(k|u_j)$ of selecting a pipeline $P_k$ from the probability distribution conditioned on the rating values for the dataset $u_j$ satisfies $$P(k|u_j) \propto \exp(-\beta(M_j - R_{j,k})); \text{ and}$$

wherein $M_j$ is a maximum rating for performance of pipelines on dataset $u_j$, and $R_{j,k}$ is the rating for performance of pipeline $P_k$ on dataset $u_j$.

10. The method as claimed in claim 1, wherein the regret for a pipeline $P_k$ rated for the dataset $u_i$ is a function of the difference between a maximum rating value for performance of pipelines on dataset $u_i$ and a rating value for performance of the pipeline $P_k$ on dataset $u_i$.

11. A computing system for selecting preferred machine learning pipelines for processing new datasets, the system comprising:
a memory subsystem, with program instructions included thereon; and
a processor in communication with the memory subsystem, wherein the program instructions cause the processor to:
for a plurality of machine learning pipelines and a plurality N of datasets previously-processed by the pipelines, store a plurality of rating values, each rating value corresponding to a performance of a pipeline of the plurality of machine learning pipelines and for a dataset of the plurality N of datasets;
for each pair $u_{i=1 \text{ to } N}$, $u_{j=1 \text{ to } N}$, $i \pm j$ of the plurality N of previously-processed datasets, determine a distance $d_{i,j}$ from $u_i$ to $u_j$ in a latent space, wherein the distance $d_{i,j}$ corresponds to an expected value of a regret incurred when the pipeline, selected in a predetermined manner based on a set of rating values for a dataset $u_j$, is rated for a performance of the selected pipeline for a dataset $u_i$, and wherein the regret for the selected pipeline includes a monotonically decreasing function of the rating value for the performance of the pipeline for the dataset $u_i$;
cluster the plurality N of previously-processed datasets in the latent space and identify a representative dataset in each cluster for which each distance to the dataset from other datasets in the cluster is minimized over the cluster;
in response to receiving a new dataset, select a set of preferred pipelines from the plurality of machine learning pipelines for processing the new dataset, each preferred pipeline being selected according to a set of rating values for the representative dataset; and
process the new dataset in the set of preferred pipelines.

12. The system as claimed in claim 11, wherein the predetermined manner for selecting the pipeline based on the rating values for the dataset $u_j$ comprises:
selecting the pipeline as a random variable from a probability distribution conditioned on the rating values for the dataset $u_j$; and
wherein the expected value of the regret comprises a probability-weighted average of a set of regrets incurred for a respective set of preferred pipelines.

13. The system as claimed in claim 12, wherein the program instructions further cause the processor to:
determine a rating value for a performance of each pipeline of the set of preferred pipelines for the new dataset;
calculate a regret incurred for each pipeline of the set of preferred pipelines for the new dataset;
select at least one further preferred pipeline in the predetermined manner, based on the rating values for the performance and the representative dataset corresponding to the at least one further preferred pipeline with a lowest regret for the new dataset; and
process the new dataset in each of the at least one further preferred pipeline.

14. The system as claimed in claim 13, wherein the program instructions further cause the processor to:
determine a rating value for the performance of each of the at least one further preferred pipeline for the new dataset; and
identify, in response to the determination of the rating value for the performance of each of the at least one further preferred pipeline for the new dataset, a pipeline among the at least one further pipeline with a highest rating value for the new dataset.

15. The system as claimed in claim 14, wherein the set of preferred pipelines comprises a set of highest-rated pipelines for the corresponding representative datasets.

16. A computer program product for selecting preferred machine learning pipelines for processing new datasets, the computer program product comprising a computer readable storage medium having program instructions embodied therewith, the program instructions executable by a device to cause the device to:
for a plurality of machine learning pipelines and a plurality N of datasets previously-processed by the pipelines, store a plurality of rating values, each rating value corresponding to a performance of a pipeline of the plurality of machine learning pipelines and for a dataset of the plurality N of datasets;
for each pair $u_{i=1 \text{ to } N}$, $u_{j=1 \text{ to } N}$, $i \pm j$ of the plurality N of previously-processed datasets, determine a distance $d_{i,j}$ from $u_i$ to $u_j$ in a latent space, wherein the distance $d_{i,j}$ corresponds to an expected value of a regret incurred when the pipeline, selected in a predetermined manner based on a set of rating values for a dataset $u_j$, is rated for a performance of the selected pipeline for a dataset $u_i$, and wherein the regret for the selected pipeline includes a monotonically decreasing function of the rating value for the performance of the pipeline for the dataset $u_i$;
cluster the plurality N of previously-processed datasets in the latent space and identify a representative dataset in each cluster for which each distance to the dataset from other datasets in the cluster is minimized over the cluster;
in response to receiving a new dataset, select a set of preferred pipelines from the plurality of machine learning pipelines for processing the new dataset, each preferred pipeline being selected according to a set of rating values for the representative dataset; and
process the new dataset in the set of preferred pipelines.

17. The computer program product as claimed in claim 16, wherein the predetermined manner for selecting the pipeline based on the rating values for the dataset $u_j$ comprises:
selecting the pipeline as a random variable from a probability distribution conditioned on the rating values for the dataset $u_j$; and
wherein the expected value of the regret comprises a probability-weighted average of a set of regrets incurred for a respective set of preferred pipelines.

18. The computer program product as claimed in claim 17, wherein the program instructions further cause the device to:

determine a rating value for a performance of each pipeline of the set of preferred pipelines for the new dataset;

calculate a regret incurred for each pipeline of the set of preferred pipelines for the new dataset;

select at least one further preferred pipeline in the predetermined manner, based on the rating values for the performance and the representative dataset corresponding to the at least one further preferred pipeline with a lowest regret for the new dataset; and process the new dataset in each of the at least one further preferred pipeline.

19. The computer program product as claimed in claim 18, wherein the program instructions further cause the device to:

determine a rating value for the performance of each of the at least one further preferred pipeline for the new dataset; and identify, in response to the determination of the rating value for the performance of each of the at least one further preferred pipeline for the new dataset, a pipeline among the at least one further pipeline with a highest rating value for the new dataset.

20. The computer program product as claimed in claim 19, wherein the set of preferred pipelines comprises a set of highest-rated pipelines for the corresponding representative datasets.

* * * * *